United States Patent
Macnamara et al.

(10) Patent No.: US 11,567,556 B2
(45) Date of Patent: Jan. 31, 2023

(54) PLATFORM SLICING OF CENTRAL PROCESSING UNIT (CPU) RESOURCES

(71) Applicant: Intel Corporation, Santa Clara, CA (US)

(72) Inventors: Chris Macnamara, Limerick (IE); John J. Browne, Limerick (IE); Tomasz Kantecki, Ennis (IE); David Hunt, Meelick (IE); Anatoly Burakov, Shannon (IE); Srihari Makineni, Portland, OR (US); Nikhil Gupta, Portland, OR (US); Ankush Varma, Portland, OR (US); Dorit Shapira, Atlit (IL); Vasudevan Srinivasan, Portland, OR (US); Bryan T. Butters, Gilbert, AZ (US); Shrikant M. Shah, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 169 days.

(21) Appl. No.: 16/833,008

(22) Filed: Mar. 27, 2020

(65) Prior Publication Data

US 2020/0225724 A1 Jul. 16, 2020

Related U.S. Application Data

(60) Provisional application No. 62/825,598, filed on Mar. 28, 2019.

(51) Int. Cl.
*G06F 1/324* (2019.01)
*G06F 1/20* (2006.01)
(Continued)

(52) U.S. Cl.
CPC .............. *G06F 1/324* (2013.01); *G06F 1/206* (2013.01); *G06F 1/3296* (2013.01); *G06F 9/5094* (2013.01)

(58) Field of Classification Search
CPC ........................................................ G06F 1/324
See application file for complete search history.

(56) References Cited

U.S. PATENT DOCUMENTS

| 10,409,354 B2* | 9/2019 | Tagata | G06F 1/3243 |
| 2007/0043964 A1* | 2/2007 | Lim | G06F 1/324 |
| | | | 713/322 |

(Continued)

OTHER PUBLICATIONS

"A Minimum Complete Tutorial of CPU Power Management, C-states and P-states", https://metebalci.com/blog/a-minimum-complete-tutorial-of-cpu-power-management-c-states-and-p-states/, Copyright ©2017-2022 Mete Balci, 13 pages.

(Continued)

*Primary Examiner* — Suresh Suryawanshi
(74) *Attorney, Agent, or Firm* — Compass IP Law PC

(57) ABSTRACT

Examples herein relate to assigning, by a system agent of a central processing unit (CPU), an operating frequency to a core group based priority level of the core group while avoiding throttling of the system agent. Avoiding throttling of the system agent can include maintaining a minimum performance level of the system agent. A minimum performance level of the system agent can be based on a minimum operating frequency. Assigning, by a system agent of a central processing unit, an operating frequency to a core group based priority level of the core group while avoiding throttling of the system agent can avoid a thermal limit of the CPU. Avoiding thermal limit of the CPU can include adjusting the operating frequency to the core group to avoid performance indicators of the CPU. A performance indicator (Continued)

can indicate CPU utilization corresponds to Thermal Design Point (TDP).

20 Claims, 15 Drawing Sheets

(51) Int. Cl.
  *G06F 9/50* (2006.01)
  *G06F 1/3296* (2019.01)

(56) References Cited

U.S. PATENT DOCUMENTS

| | | | | |
|---|---|---|---|---|
| 2012/0079290 | A1* | 3/2012 | Kumar | G06F 1/3228 |
| | | | | 713/300 |
| 2014/0025925 | A1* | 1/2014 | Kondo | G06F 15/80 |
| | | | | 712/30 |
| 2015/0058650 | A1* | 2/2015 | Varma | G06F 9/4893 |
| | | | | 713/320 |
| 2017/0168541 | A1* | 6/2017 | Gendler | G06F 1/324 |
| 2018/0059751 | A1 | 3/2018 | Jahagirdar et al. | |
| 2018/0246554 | A1* | 8/2018 | Egger | G06F 1/3243 |
| 2018/0285230 | A1* | 10/2018 | Kaburlasos | G06F 1/3206 |
| 2018/0373287 | A1* | 12/2018 | Al-Rawi | G06F 1/324 |
| 2019/0041957 | A1 | 2/2019 | Hunt et al. | |
| 2019/0377395 | A1* | 12/2019 | Kaburlasos | G06F 1/3206 |
| 2020/0209929 | A1* | 7/2020 | Gomi | G06F 1/329 |

OTHER PUBLICATIONS

Corbet, Jonathan, "Per-task CPU-frequency control", LWN.net, https://lwn.net/Articles/716303/, Mar. 8, 2017, 3 pages.

Eeekster, "QoS Class Identifier", Wikipedia, https://en.wikipedia.org/w/index.php?title=QoS_Class_Identifier&oldid=930377454, Dec. 12, 2019, 3 pages.

ETSI, "5G; System Architecture for the 5G System", Technical Specification, (3GPP TS 23.501 version 15.3.0 Release 15), Sep. 2018, 227 pages.

GSM Association, "Network Slicing", Use Case Requirements, Apr. 2018, 62 pages.

Hankendi, Can, et al., "vCap: Adaptive Power Capping for Virtualized Servers", 2013 IEEE Symposium on Low Power Electronics and Design (ISLPED), Sep. 4-6, 2013, 6 pages.

Intel Corporation, "Intel® Xeon® Processor E5-2600 Product Family Uncore Performance Monitoring Guide", Mar. 2012, 136 pages.

Intel Corporation, "Overview of Enhanced Intel SpeedStep® Technology for Intel® Processors", https://www.intel.com/content/www/us/en/support/articles/000007073/processors.html, Sep. 1, 2021, 3 pages.

Mademann, Frank, "The 5G System Architecture", Journal of ICT, vol. 6 1&2, 77-86. River Publishers, received Apr. 28, 2018, 10 pages.

Microsoft, "Introduction to Receive Side Scaling", Introduction to Receive Side Scaling—Windows drivers | Microsoft Docs, https://docs.microsoft.com/en-us/windows-hardware/drivers/network/introduction-to-receive-side-scaling, Apr. 19, 2017, 1 page.

Pandruvada, Srinivas, "Running Average Power Limit", Intel Open Source.org, https://01.org/blogs/2014/running-average-power-limit-%E2%80%93-rapl, Jun. 6, 2014, 5 pages.

Sciancalepore, Vincenzo, et al., "Mobile Traffic Forecasting for Maximizing 5G Network Slicing Resource Utilization", IEEE Conference on Computer Communications, published May 1, 2017, 9 pages.

Victor Stinner, "Tune the system for benchmarks CPU pinning and CPU isolation", pyperf, https://pyperf.readthedocs.io/en/latest/system.html, ©2016, Victor Stinner, 5 pages.

Wilke, Joe, "5G Network Architecture and FMC", Ericsson, Jul. 2017, 15 pages.

\* cited by examiner

PLATFORM SLICING OF CENTRAL PROCESSING UNIT (CPU) RESOURCES

RELATED APPLICATION

The present application claims the benefit of a priority date of U.S. provisional patent application Ser. No. 62/825,598, filed Mar. 28, 2019, the entire disclosure of which is incorporated herein by reference.

BACKGROUND

Network slicing allows for network operators to share their physical network infrastructure platform for deployment of network resources. From a mobile operator's point of view, a network slice is an independent end-to-end logical network that runs on a shared physical infrastructure, capable of providing an agreed-upon service quality. The network operator guarantees performance (e.g., latency, loss, bandwidth, or radio resources) to meet the required service quality.

DETAILED DESCRIPTION

Figure 1A:
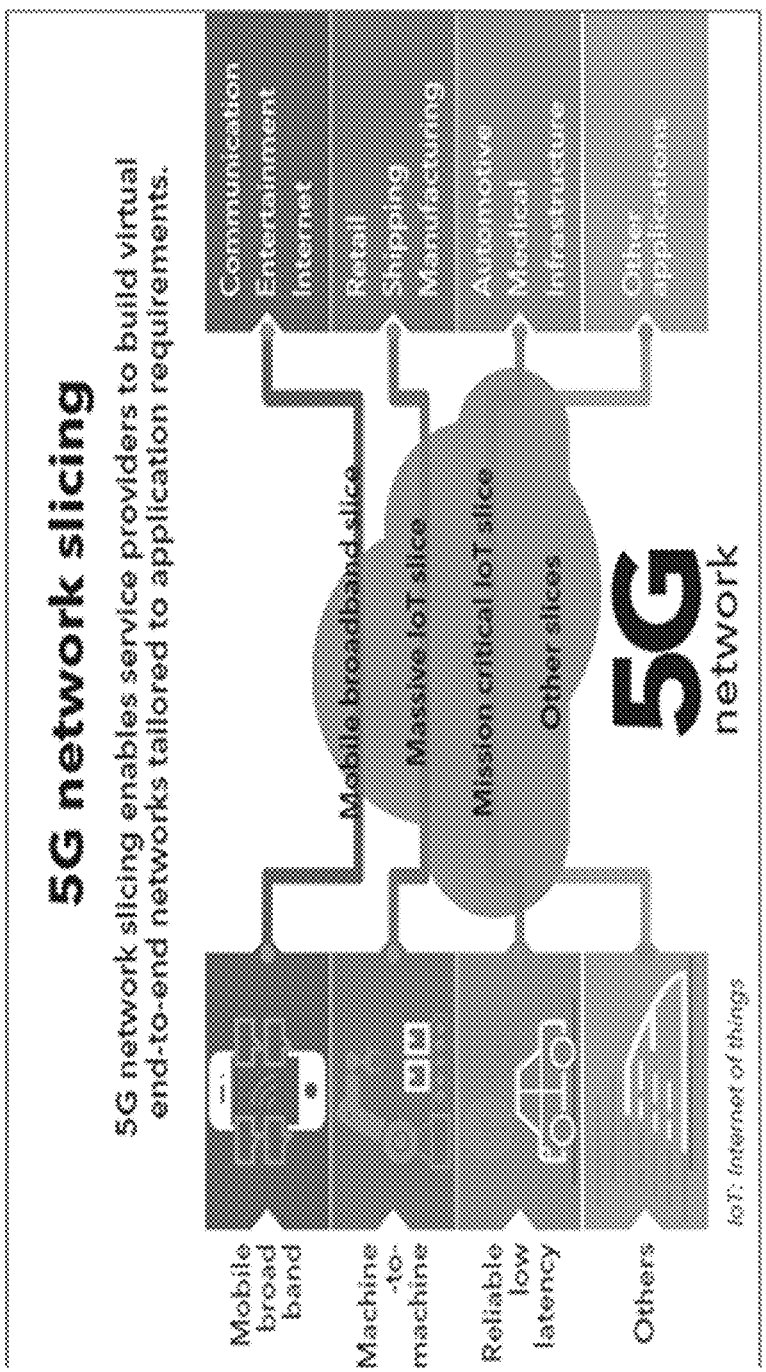
FIG. 1A depicts an example of 5G network slicing whereby various services are deployed on a physical infrastructure.

FIG. 1A depicts an example of 5G network slicing whereby various services are deployed on a physical infrastructure. For example, use of a platform infrastructure can shared among various slices that include: mobile broadband uses (e.g., telephone calls, entertainment, or Internet traffic), Internet-of-things (e.g., machine-to-machine communications, retail, shipping or manufacturing uses), reliable low latency communications (e.g., autonomous vehicle controls, medical equipment control or infrastructure control), and other applications.

For 5G network slicing, static allocation of threads pinned to cores and fixed core frequency can be employed. For example, a core frequency can be fixed to a base frequency or all cores operate in so called "turbo mode." Known methods of resource allocation are described in Sciancalepore, et al, "Forecasting for Maximizing 5G Network Slicing Resource Utilization" (2017). In some cases, dynamic tuning at runtime can be performed to turn on "turbo boost" but may provide limited ability of software and hardware to achieve better overall performance. For Network Function Virtualization (NFV), shared infrastructure containing CPUs may run unbalanced workloads with varying levels of utilization and priority across cores. For example, voice can be given preferred treatment during the day over cellular whereas video streaming can be given preferred treatment over broadband at night.

Figure 1B:
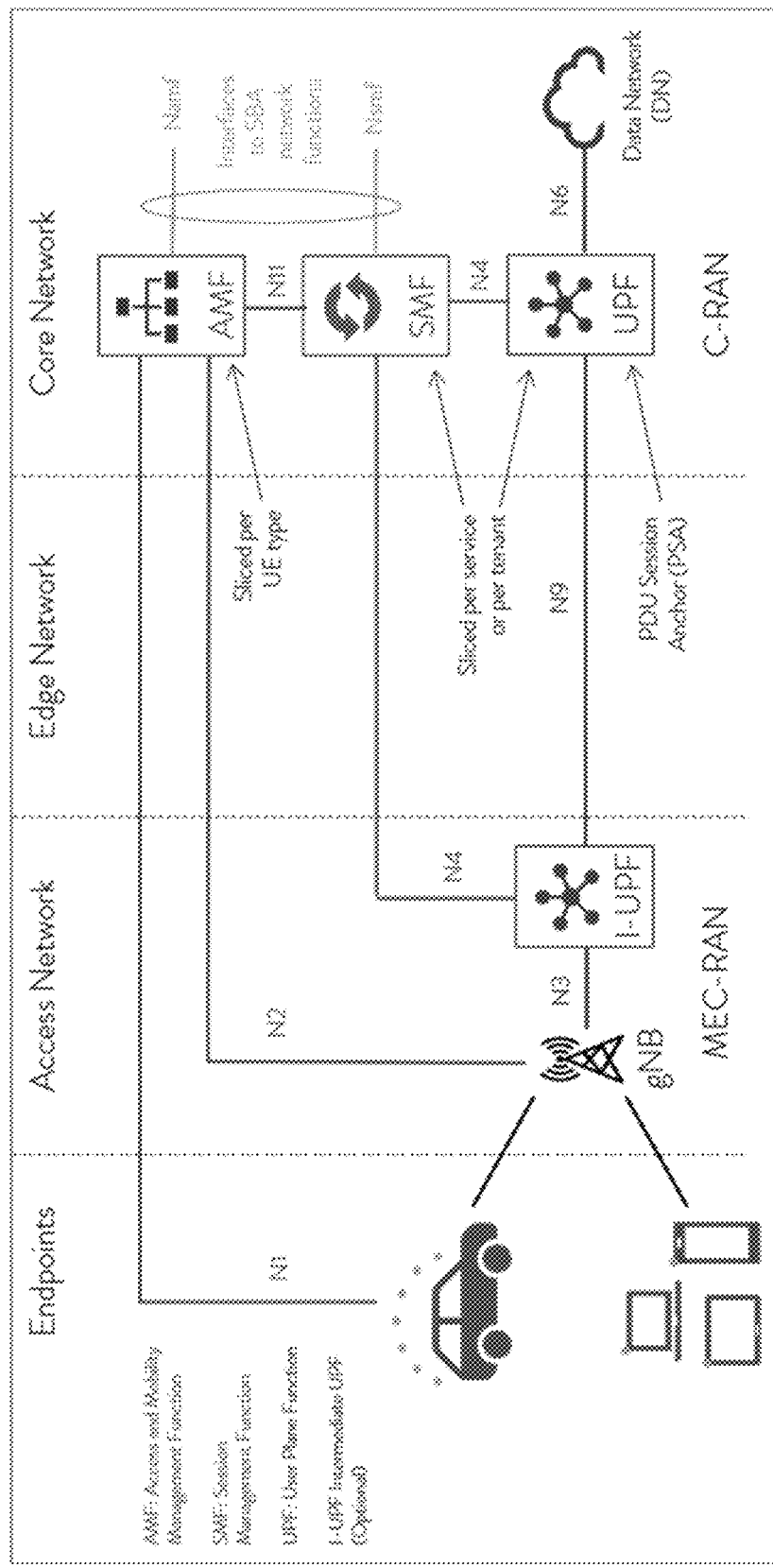
FIG. 1B depicts an example 5G Core Reference Point architecture.

FIG. 1B depicts an example 5G Core Reference Point architecture. See, for example, 3GPP TS 23.501 V0.4.0 (2017-04) and related releases from 3GPP. In this example, 5G access and 5G core network, access and mobility management function (AMF), session management function (SMF), user plane function (UPF), and intermediate user plane function (I-UPF) can be sliced at a core network. Various embodiments described herein can be applied to slice any function in the 5G Core Reference Point architecture per user element (UE) type, per service, or per tenant.

Various embodiments can allocate power or frequency of central processing unit (CPU) core(s) allocated at least to a 5G network slice to achieve performance required in a service level agreement (SLA) for a network slice. Various embodiments provision unused processor frequency to be shared among other network slices without adversely impacting an SLA of the network slices. Various embodiments attempt to improve tenant quality of service (QoS) by prioritizing per core frequency and tuning of power and frequency at runtime. Various embodiments can attempt to tune core and system agent frequency to the workload deployed on the CPU. Outside of 5G, network slicing can be applied to other networks such as Broadband forum TR-370, such that embodiments can be used in or outside of 4G or 5G wireless scenarios such as 6G or other networking contexts, Wi-Fi quality of service, 3GPP 5G User Plane Functions, and so forth.

To meet the needs of a sliced network function, a platform infrastructure can be "sliced" and key resources of CPU, cache, accelerators, memory bandwidth, and network interface resources (e.g., network interface cards (NICs) or smartNIC) are prioritized and applied to the most important workloads for a network slice on a platform. Various embodiments provide for tuning CPU power or frequency or other resources.

Various embodiments provide at least a guarantee of network slice performance on a selected set of CPU cores by dynamically assigning processor frequency and automatically sharing unused processor power or frequency among network slices. Various embodiments provide for automatically targeting a desired frequency and adjusting the processor state to set the CPU frequencies (e.g., core and system agent) to needs of a network slice workload. Various embodiments create a slice of CPU core(s) power or frequency in a way that provides a guaranteed performance and sharing of this power or frequency based on priority.

Various embodiments provide an ability to direct more power to a subset of one or more cores and allow for automatic frequency tuning to meet the needs of the workload on the one or more cores. A controller can provide for automatically latching to a frequency per core taking into consideration the priority of the workload on the core and level of system agent frequency. For example, frequency on a subset of one or more cores can be increased without causing the system agent to reduce frequency. Reducing system agent frequency can impact overall system performance. However, this characteristic may change depending on the type of workload (e.g., communications, cloud or enterprise).

Various embodiments provide for allocating committed performance (e.g., power or frequency) for groups of one or more cores and burst capacity to be shared based on priority.

For example, a higher core frequency can be allocated for low latency high priority network traffic. Various embodiments provide automatically re-sharing allocated power headroom at runtime based on priority. For example, power or frequency allocated to idle/low utilization high cores power can be shared temporarily with busy lower priority cores allowing lower priority cores to burst in performance. Power and/or frequency assignment to a group of one or more cores at runtime can automatically hunt for a best available frequency to improve performance for key workloads.

For example, a group of one or more cores can have a default frequency of 1.5 GHz. When faced with increased workloads, frequency of selected cores can be increased but other cores' frequency can remain intact. A Thermal Design Point (TDP) (or Thermal Design Power) of a CPU is monitored to determine whether the CPU is fully loaded. The selected cores are stepped up in frequency to within y % of this TDP level (e.g., 5%) to deliver increased frequency. For example, a TDP can be a maximum amount of heat generated by a CPU that an associated cooling system of the CPU can dissipate under any workload. Exceeding a TDP can cause the CPU to throttle or a CPU's cooling system (e.g., fan or heat sink) to not adequately cool the CPU. In some examples, TDP can be measured by reading utilization or busy level indicators of one or more cores of the CPU.

Figure 2A:
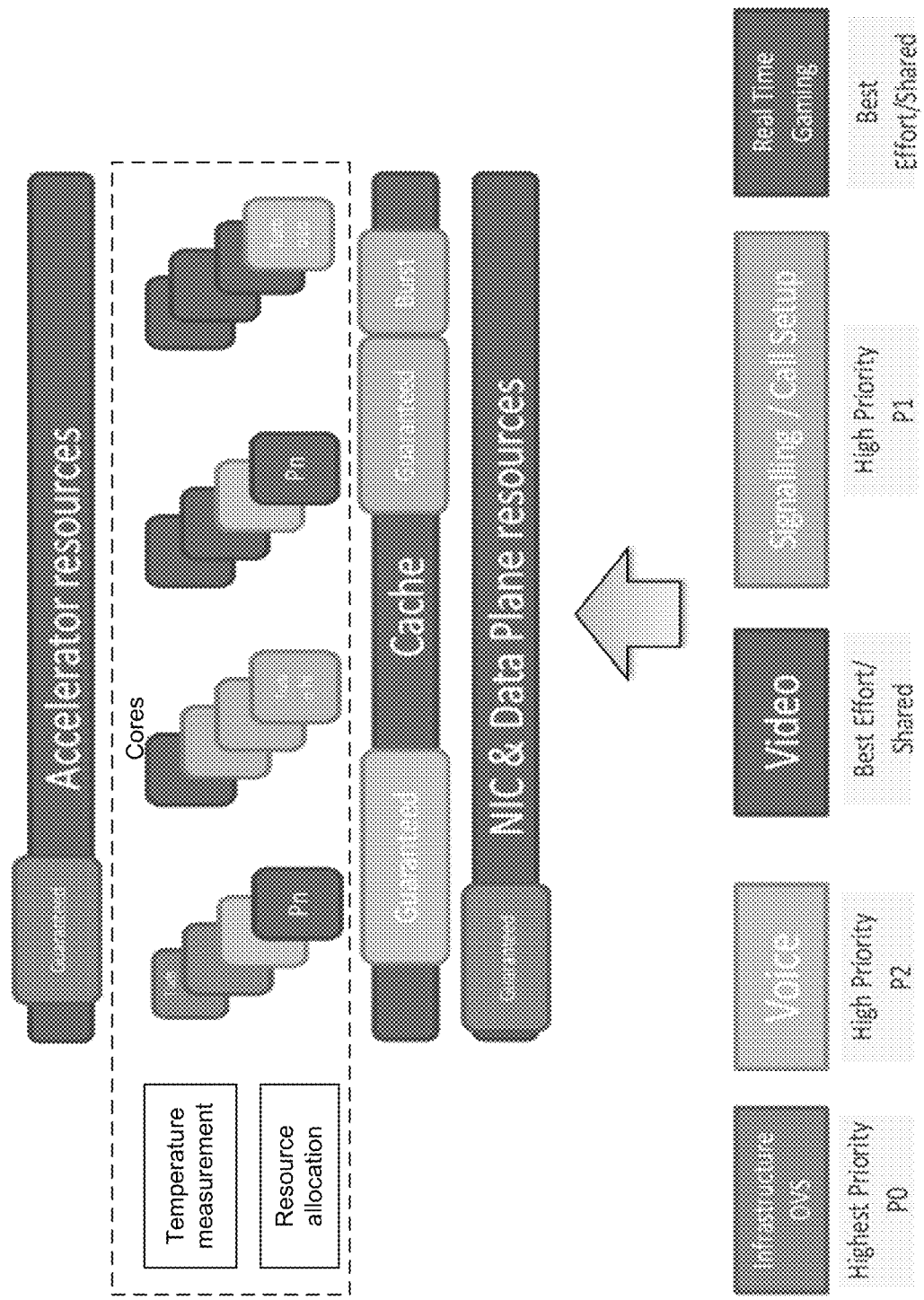
FIG. 2A depicts an example of resource allocation based on priority level.

FIG. 2A depicts an example of resource allocation based on priority level. Higher power can be supplied to high priority cores whose workloads have performance requirements (e.g., low latency high priority network traffic). Low power cores can supply best efforts in terms of meeting performance requirements. Burst allocation can be delivered to workloads based on priority. For example, an infrastructure Open vSwitch (OVS) can be provided a highest priority level P0. Signaling and call setup can be given a next highest priority level P1. Voice can be given a third highest priority level P2. Video and real time gaming can be given best effort/shared resources priority level.

For example, for priority level P0, resources of a network interface card (NIC) and data plane resources (e.g., match-action or packet processing), core, and accelerator resources can be guaranteed for OVS. For example, cache, memory bandwidth and core resources can be guaranteed for signaling/call setup (priority P1) and voice services (for priority level P2). However, some signaling/call setup can receive burst resources. Video and real time gaming can receive best effort or shared cores.

In some examples, a priority level can be based on Quality of Service (QoS) can of 3GPP Long Term Evolution (LTE) QoS Class Identifier (QCI). A QCI can identify one or more of: guaranteed bit rate (GBR), non-GBR, scheduling priority, resource type, packet delay budget and packet error loss rate for particular traffic. 3GPP TS 23.203 Rel-14 (2017) provides an example of QCI levels and associated parameters.

Figure 2B:
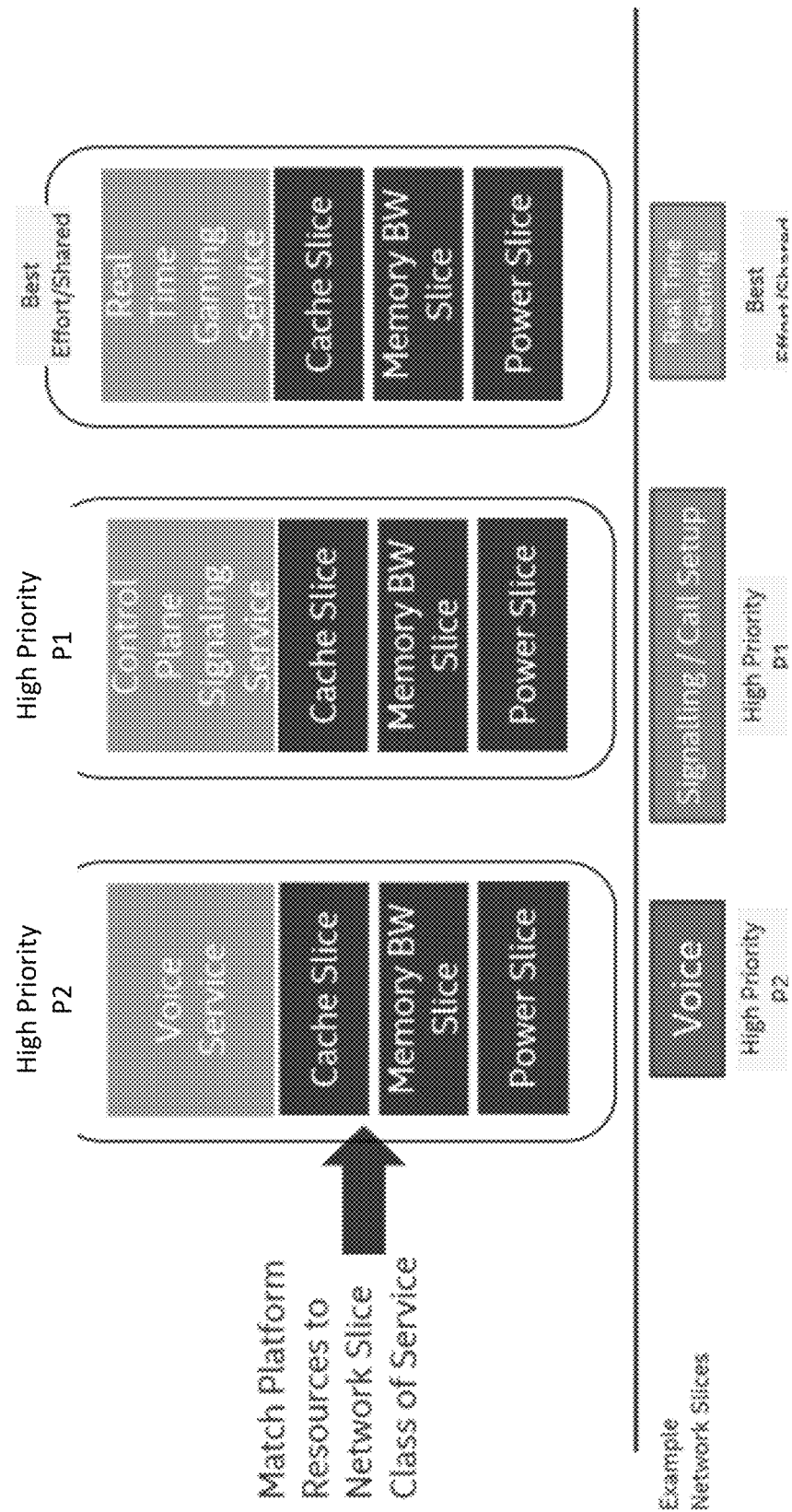
FIG. 2B depicts an example allocation of frequency based on priority level.

FIG. 2B depicts an example allocation of frequency based on priority level. Various embodiments use CPU power controls to enforce the fixed guarantee capacity for a "slice" and monitor actual utilization to dynamically share the burst capacity and unused guaranteed capacity between contending slices. At runtime, sharing of allocated power headroom can occur based on slice priority.

A high priority slice, core or service has a guaranteed power/frequency allocation under normal conditions and is prioritized when throttling. A low priority slice, core or service has a guaranteed TDP under normal conditions and is not prioritized when throttling. Moreover, more dedicated cache space and higher memory bandwidth can be allocated to higher priority processes than to lower priority processes. At runtime (controlled by software or hardware based on allocation), burst or sharable TDP capacity is available for low or high priority slice, core or services. If a high priority slice, core or service needs capacity, the high priority slice, core or service can receive the capacity subject to the TDP not being met or exceeded.

High priority TDP can be consumed by other slices when it is not being used. For example, if TDP is 270 W and 200 W is used, 70 W out of TDP budget is available for high and low priority work. High priority work can receive prioritized use of available TDP with some spare available TDP for lower priority work. For example, for 100% polling workloads such as DPDK, sharing can involve software stepping down as the core never goes to an idle state even when there is no useful work performed on the core.

Figure 2C:
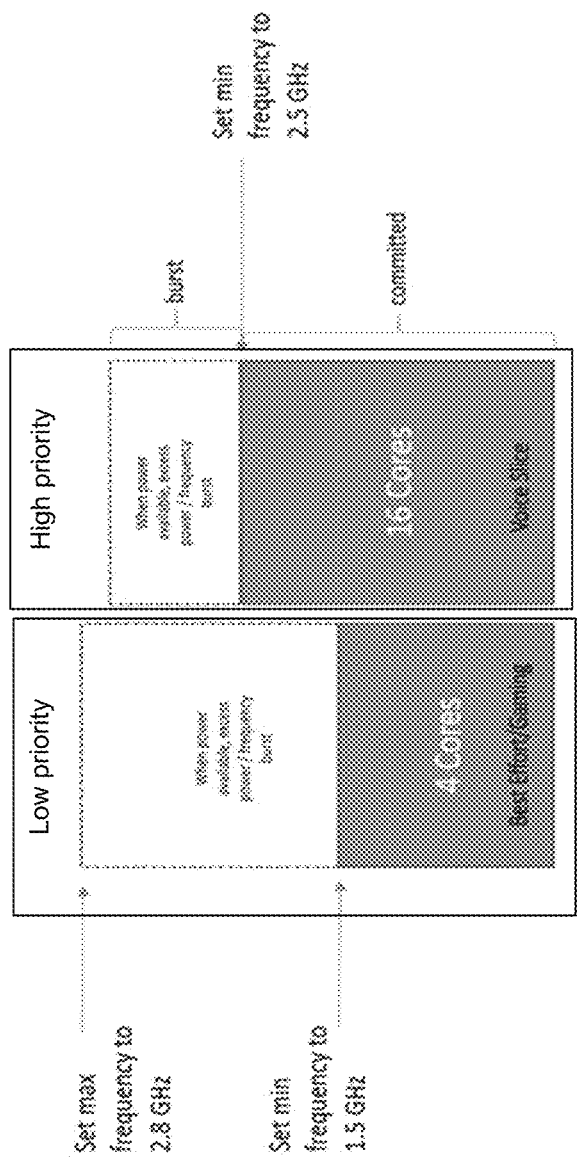
FIG. 2C depicts an example allocation of frequency ranges to cores.

FIG. 2C depicts an example allocation of frequency ranges to cores. A group of 4 cores is allocated a low priority (e.g., best efforts) and another group of 16 cores is allocated a high priority. In this example, for the low priority cores, a minimum frequency is 1.5 GHz and a maximum frequency is above 2.8 GHz. For the high priority cores, a minimum frequency is 2.5 GHz and a maximum frequency is above 2.5 GHz. However, other configurations can be used.

Figure 3:
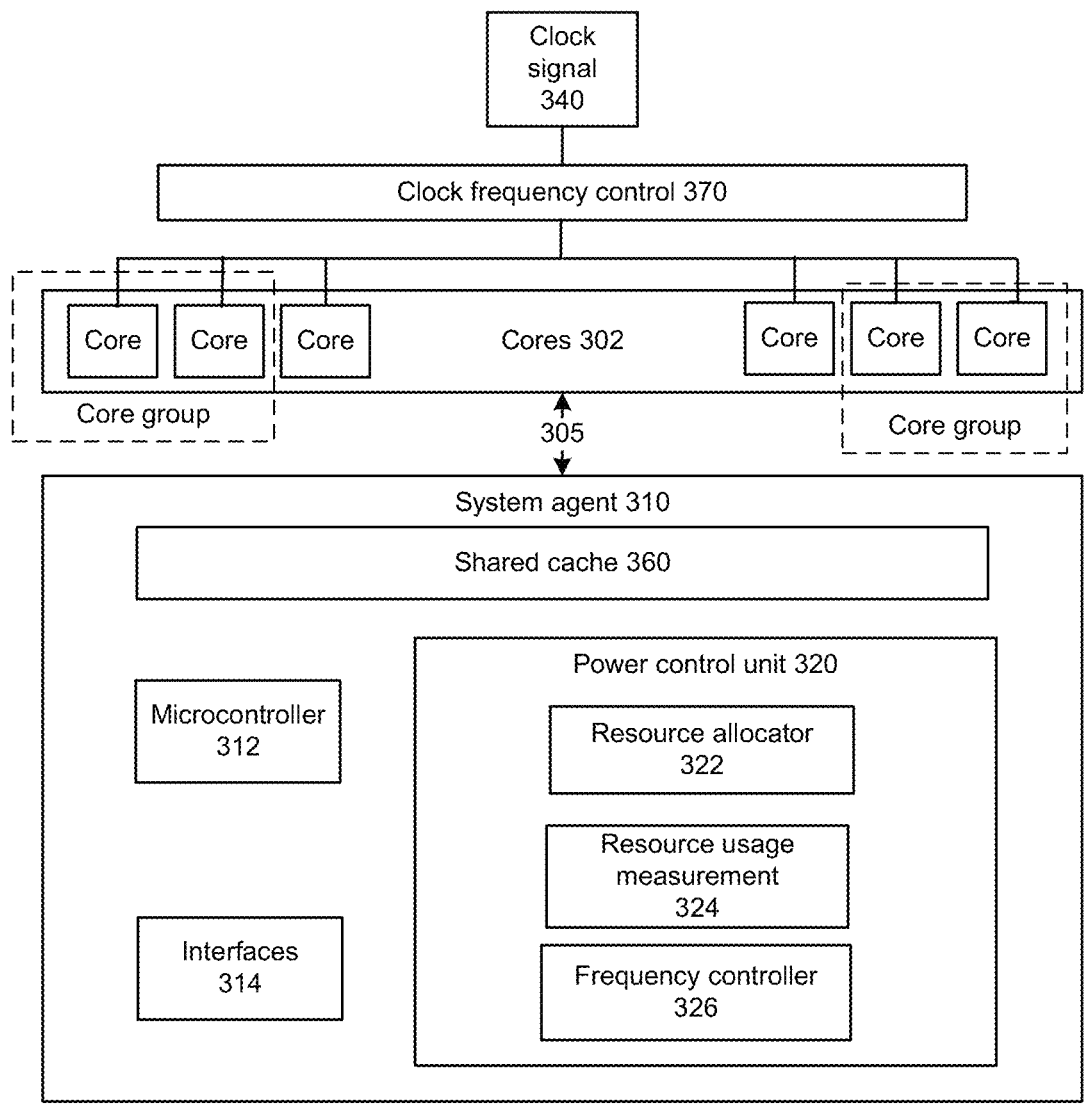
FIG. 3 depicts an example block diagram of a portion of a central processing unit (CPU).

FIG. 3 depicts an example block diagram of a portion of a central processing unit (CPU). As shown in FIG. 3, processor can include multiple cores 302. A core can be an execution core or computational engine that is capable of executing instructions. A core can have access to its own cache and read only memory (ROM), or multiple cores can share a cache or ROM. Cores can be homogeneous and/or heterogeneous devices. Frequency or power use of a core can be adjustable. Any type of inter-processor communication techniques can be used, such as but not limited to, messaging, inter-processor interrupts (IPI), inter-processor communications, and so forth. Cores can be connected in any type of manner, such as but not limited to, bus, ring, or mesh.

Cores 302 may be coupled via an interconnect 305 to a system agent (uncore) 310. System agent 310 can include a shared cache 360 which may include any type of cache (e.g., level 1, level 2, or last level cache (LLC)). System agent 310 can include or more of: a memory controller, a shared cache, a cache coherency manager, arithmetic logic units, floating point units, core or processor interconnects, or bus or link controllers. System agent or uncore can provide one or more of: direct memory access (DMA) engine connection, non-cached coherent master connection, data cache coherency between cores and arbitrates cache requests, or Advanced Microcontroller Bus Architecture (AMBA) capabilities. System agent or uncore can manage priorities and clock speeds for receive and transmit fabrics and memory controllers.

In some examples, cores 302 can be allocated to groups of one or more cores. For example, a core group may access a single power domain or an independent power domain to operate at an operating voltage received either from an on-chip linear regulator or an off-chip source (e.g., power supply). According to various embodiments, power control unit 320 can allocate clock frequency or power to a core group (e.g., group of one or more cores) based on a priority level assigned to the core group. Different priority levels can be assigned to different core groups, or different core groups can have the same priority level. A core group with a higher priority level can be allocated an operating frequency range that are higher than an operating frequency range allocated to a core group with a lower priority level. For example, FIG. 2C depicts an allocation of a frequency range for a high priority core group and low priority core group.

Referring again to FIG. 3, power control unit (PCU) 320 can use resource allocator 322 to perform frequency tuning of one or more core groups to obtain a highest frequency of operation for a core group based on priority level but subject to a minimum operating frequency of a lower priority core group, acceptable system agent performance and avoiding Thermal Design Point (TDP). In addition or alternatively, PCU 320 can be implemented as processor-executed software of firmware with access to power resource utilization. For example, resource allocator 322 can apply a core to priority and frequency configuration as follows.

| Core | Core Group | Priority | Minimum Frequency | Current Frequency | Maximum Frequency |
|---|---|---|---|---|---|
| 0 | 0 | 1 | 0.5 GHz | 0.9 GHz | 1.5 GHz |
| 1 | 0 | 1 | 0.5 GHz | 0.9 GHz | 1.5 GHz |
| 2 | 0 | 1 | 0.5 GHz | 0.9 GHz | 1.5 GHz |
| 3 | 1 | 2 | 0.25 GHz | 0.5 GHz | 1.0 GHz |
| ... | ... | | ... | ... | ... |
| 7 | 2 | 3 | 0.1 GHz | 0.3 GHz | 0.75 GHz |

For example, resource allocator 322 can periodically re-evaluate operating frequency of a core group. Resource allocator 322 can start with allocating a minimum operating frequency to a core group based on its priority and increase the operating frequency for a time window or duration. During the time window or duration, resource allocator 322 monitors system agent performance and whether Thermal Design Point (TDP) is met. For example, resource usage measurement 324 can measure system agent performance (e.g., system agent operating frequency) or temperature of the CPU. If neither system agent performance is unacceptable nor Thermal Design Point (TDP) is met, during a next time window, resource allocator 322 can increase a frequency of the core group.

However, if during a time window or duration, system agent performance is unacceptable or Thermal Design Point (TDP) is met, resource allocator 322 can lower frequency of the core group but not beneath its minimum level during the current time window or next time window. If the core group is at its minimum frequency level, resource allocator 322 can attempt to lower a frequency of another core group (e.g., lower priority core group whose frequency is not at a minimum or a same priority level core group whose frequency is not at a minimum).

Resource allocator 322 can attempt to achieve the highest operating frequency of core groups in sequential order from highest priority level to lowest priority level. In some examples, resource allocator 322 attempts to obtain a higher frequency level for different priority levels in parallel while prioritizing higher frequencies for higher priority levels but subject to minimum operating frequency of a lower priority core group, acceptable system agent performance and avoiding Thermal Design Point (TDP). Accordingly, PCU 320 can support allowing a core group to operate frequency levels above the base frequency and share power with other core groups and uncore 310. Accordingly, resource allocator 322 can allocate operating frequencies to different core groups in a non-uniform and fine-grained manner such that different core groups could operate at different frequencies.

Frequency controller 326 can modify a frequency of system agent 310 or cores 302. For example, to modify an operating frequency of system agent 310 or a core group, frequency controller 326 can configure clock frequency control 370 to increase or reduce a clock frequency provided by clock signal source 340 to system agent 310 or a core group among cores 302. In some examples, increases or decreases in clock frequency occur in discrete frequency intervals.

In some examples, PCU 320 can access or track watts consumed by cores 302 and system agent 310 and compare the watts consumed to TDP to determine the available burst/headroom for a core group. For example, a CPU running at 100 watts with a TDP of 150 watts has 50 watts available for a power burst to be allocated to higher priority core groups before lower priority core groups.

For example, for a processor with TDP of 35W, if a CPU chassis and cooling system is capable of dissipating that much heat, the CPU will operate as intended. However, TDP can be different than a maximum power the CPU can consume. In some cases, a CPU can consume more than the TDP power for a short period of time as it takes time for heat to propagate and a short burst may not necessarily violate TDP.

Where cores 302 are used to perform network or packet processing (e.g., 5G network slicing, or other examples), system agent 310 is involved with monitoring input/output operations involving packets received or transmitted using a network controller or switch. Protecting against diminished performance of system agent 310 can prevent diminished packet processing speeds. For example, system agent performance can be monitored by monitoring a frequency of operation of system agent 310. For example, a register can store a frequency of operation of system agent 310. If the system agent frequency is too low, PCU 320 can increase frequency of operation of system agent 310. If increasing frequency of operation of system agent 310 involves lowering frequency of operation of one or more core groups, PCU 320 can lower frequency of operation of one or more lower priority core groups. If the frequency of operation of system agent 310 does not increase to a minimum level after lowering frequency of operation of one or more lower priority core groups, PCU 320 can lower frequency of operation of one or more high priority core groups.

In some examples, a temperature of a CPU can be approximated using Running Average Power Limit (RAPL). In other words, a CPU's temperature in relation to TDP can be estimated based on RAPL. RAPL can be read from a set of registers with counters providing energy and power consumption information. RAPL estimates energy usage by using hardware performance counters and I/O models. A register can be a model-specific register (MSR) used for debugging, program execution tracing, and computer performance monitoring. In some examples, in addition or alternatively to use of RAPL, resource usage measurement can read registers IA_perf_status and/or IA_perf_ct or hardware power register 0×700 to determine power usage and approximate CPU temperature.

Various examples of PCU 320 are described with respect to section 2.6.1 of Intel® Xeon® Processor E5-2600 Product Family Uncore Performance Monitoring Guide (March 2012), and earlier or later versions thereof, which is incorporated by reference herein in its entirety.

A core group can be assigned to execute a process or service (e.g., function as a service (FaaS)). An orchestrator or system administrator can allocate a process or service to a core group based on priority level of the process or service. For example, a priority of a process or service can be set using Linux sysfs energy_performance_preference and when a process is deployed onto this core, the process maps to this priority. NFV threads in a process may be isolated and pinned to cores where a 1-to-1 priority can be set. In alternative non-isolated, non-pinned scenarios, processes running on a core map to the priority of the core. Hence, many processes can be prioritized by this mapping. Some processes include network or packet processing (e.g., 5G network slicing described herein).

For example, for 5G network slicing, high priority processes can include mobility management function (AMF) or virtual switching; medium priority processes can include session management function (SMF), signaling or call setup or voice communications processing; and low priority processes can include user plane function (UPF) and intermediate user plane function (I-UPF), real-time gaming or streaming video or audio.

A packet can include a header and payload. A header can be a media access control (MAC) source and destination addresses, EtherType, Internet Protocol (IP) source and destination addresses, IP protocol, Transmission Control Protocol (TCP) port numbers, virtual local area network (VLAN) or Multi-Protocol Label Switching (MPLS) tags. A packet processing can perform packet processing using Network Function Virtualization (NFV), software-defined networking (SDN), virtualized network function (VNF), Evolved Packet Core (EPC), or 5G network slicing. Some example implementations of NFV are described in European Telecommunications Standards Institute (ETSI) specifications or Open Source NFV Management and Orchestration (MANO) from ETSI's Open Source Mano (OSM) group. VNF can include a service chain or sequence of virtualized tasks executed on generic configurable hardware such as firewalls, domain name system (DNS), caching or network address translation (NAT) and can run in virtual execution environments. VNFs can be linked together as a service chain. In some examples, EPC is a 3GPP-specified core architecture at least for Long Term Evolution (LTE) access. 5G network slicing can provide for multiplexing of virtualized and independent logical networks on the same physical network infrastructure.

Packet processing can also be in connection with 3GPP Radio Access Network (RAN) and Core Network (CN), Transport Network (TN) from Broadband Forum and Internet Engineering Task Force (IETF), ITU-T (GSTR-TN5G), IEEE (NGFI 1914), and so forth.

Packet processing process can perform processing of received packets such as one or more of: determination if a packet is valid (e.g., correct Ethernet type, correct checksum, correct IP Protocol type, valid layers 4-7 protocol type), determination of packet destination (e.g., next hop, destination queue), match-action activity, or perform one or more of: IP filter checks, flow table lookup, access control lists (ACL), firewall, match-actions operations, outgoing port selection using a forwarding table, packet decryption, packet encryption, denial of server protection, packet counting, billing, traffic management/conditioning, traffic shaping/traffic scheduling, packet marking/remarking, packet inspection of layers 4-7, or traffic load balancing/load distribution. For example, packet processing process can perform Data Plane Development Kit (DPDK) or OpenData-Plane (ODP) compatible packet processing.

In some cases, a process can be a serverless application or function (e.g., FaaS). For example, for a serverless application, a cloud service provider dynamically manages allocation and provisioning of servers and a serverless application runs in stateless compute containers that are event-triggered and may last for one invocation. A serverless application can be event-driven, cloud-based application where application development relies on a combination of third-party services, client-side logic and cloud-hosted remote procedure calls. Serverless application can be pay-per-use computing or bare-code where users are charged based on time and computing resources (e.g., CPU, networking, or memory) allocated to run serverless application without associated fees for idle time of computing resources. In some examples, a serverless application or function can be performed by a network infrastructure device (e.g., forwarding element, router, switch, network interface controller) or accelerator, in addition or alternative to use of a server or general purpose computing platform.

System agent 310 may be coupled with a system memory (not shown) using interfaces 314. In addition, system agent 310 can include a microcontroller 312.

Figure 4A:
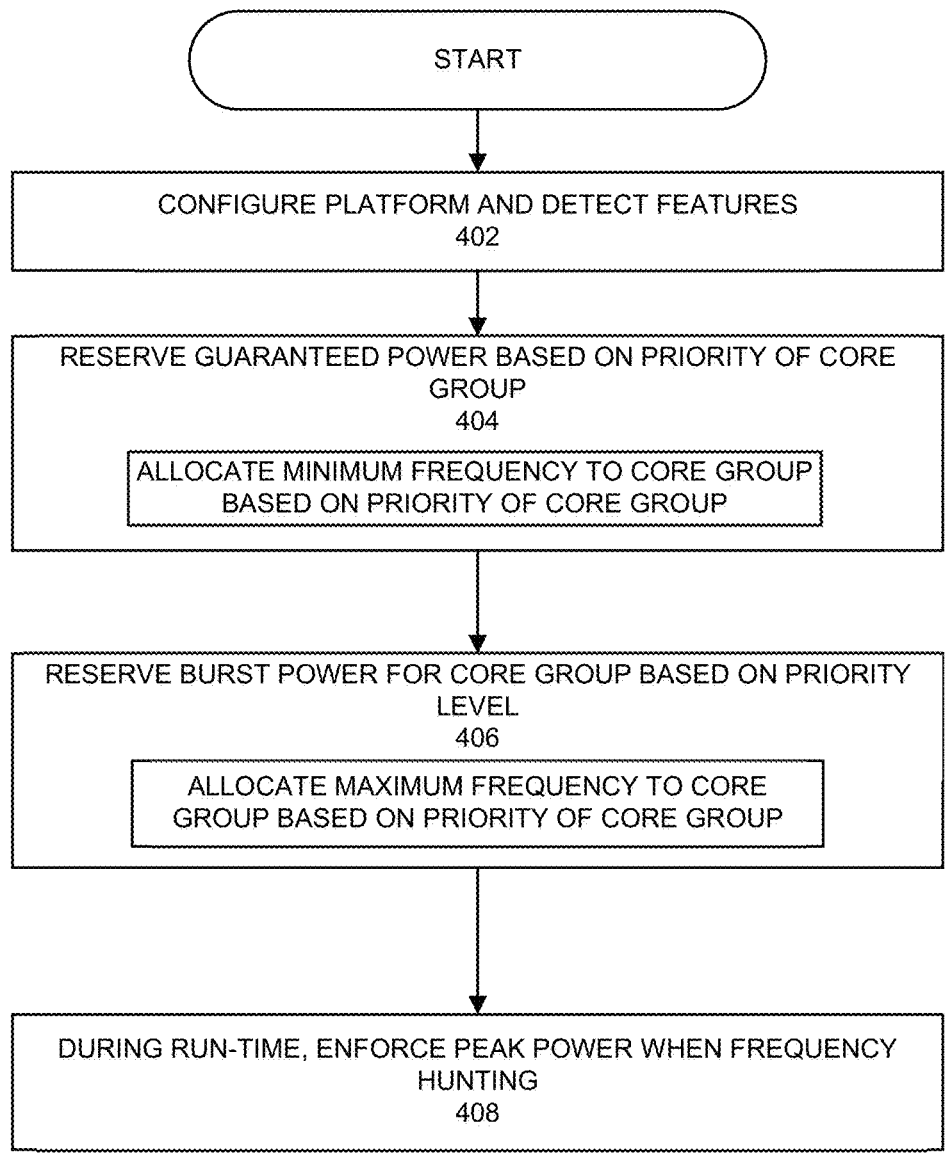
FIGS. 4A-4C depict processes.

FIG. 4A depicts an example process to allocate committed performance for critical component slicing. The process of FIG. 4A reserves guaranteed frequency and burst frequency for critical platform hardware components for use by processes. The process can be performed by a component (e.g., hardware, firmware, and/or processor-executed software) that controls frequency allocated to one or more cores of a CPU. At 402, platform feature configuration occurs. Platform configuration can include configuring a platform to allocate a core group of one or more cores for power or frequency tuning. For example, the platform can include at least a CPU node with one or more cores, and other resources that can be power or frequency controlled such as processors on a network interface, accelerator devices (e.g., decryption, encryption, TCP segmentation offload, and so forth). For example, a platform can be prepared to receive tags identifying priority of a process (e.g., FaaS or 5G network slice) so that the platform can allocate a process to the appropriate priority core group. At 404, allocation of guaranteed power for processors in a core group based on priority occurs. A core group can be allocated an operating frequency band from minimum frequency depending on a priority level of the core group. The guaranteed power can be a minimum power level or minimum frequency level. For example, a core group identified as highest priority can run critical or highest priority processes are assigned a highest base (minimum) frequency. A core group identified as next highest priority are assigned a same or lower base frequency (minimum) and so forth. A highest priority core group can be allocated to perform critical components whereas a lower priority core group can be allocated to perform less critical, lower priority processes.

At 406, a burst power level can be reserved for a core group based on priority level. For example, burst power level for a core group can be configured by configuring a peak clock frequency applied by a core group. In some examples, the burst power level can be allocated based on priority level of the core group. For example, a core group identified as highest priority can be granted the highest burst power level (e.g., frequency level). For example, a core group identified as next highest priority can be granted the next highest burst power level (e.g., frequency).

At 408, during runtime of processes on the core group, a check is made that a frequency selected does not cause TDP for the CPU (including system agent) to be met or exceeded. If a selected frequency for the core group causes the TDP to be met or exceeded, the frequency for the core group is reduced, based on priority, until the TDP is not met or exceeded. For example, Running Average Power Limit (RAPL) counter values can be used to estimate whether TDP is being met or not met. In addition, or alternatively, a "busy" indication from a core group represents tasks completed compared to idle polling and can be used to identify whether a TDP is being met or not met. An example determination of "busy" indication is described at least in U.S. Patent Application Publication 2019/0041957, which is incorporated by reference in its entirety. Other measures described herein can be used to estimate whether TDP is being met or not met, including temperature measurement of the CPU.

Figure 4B:
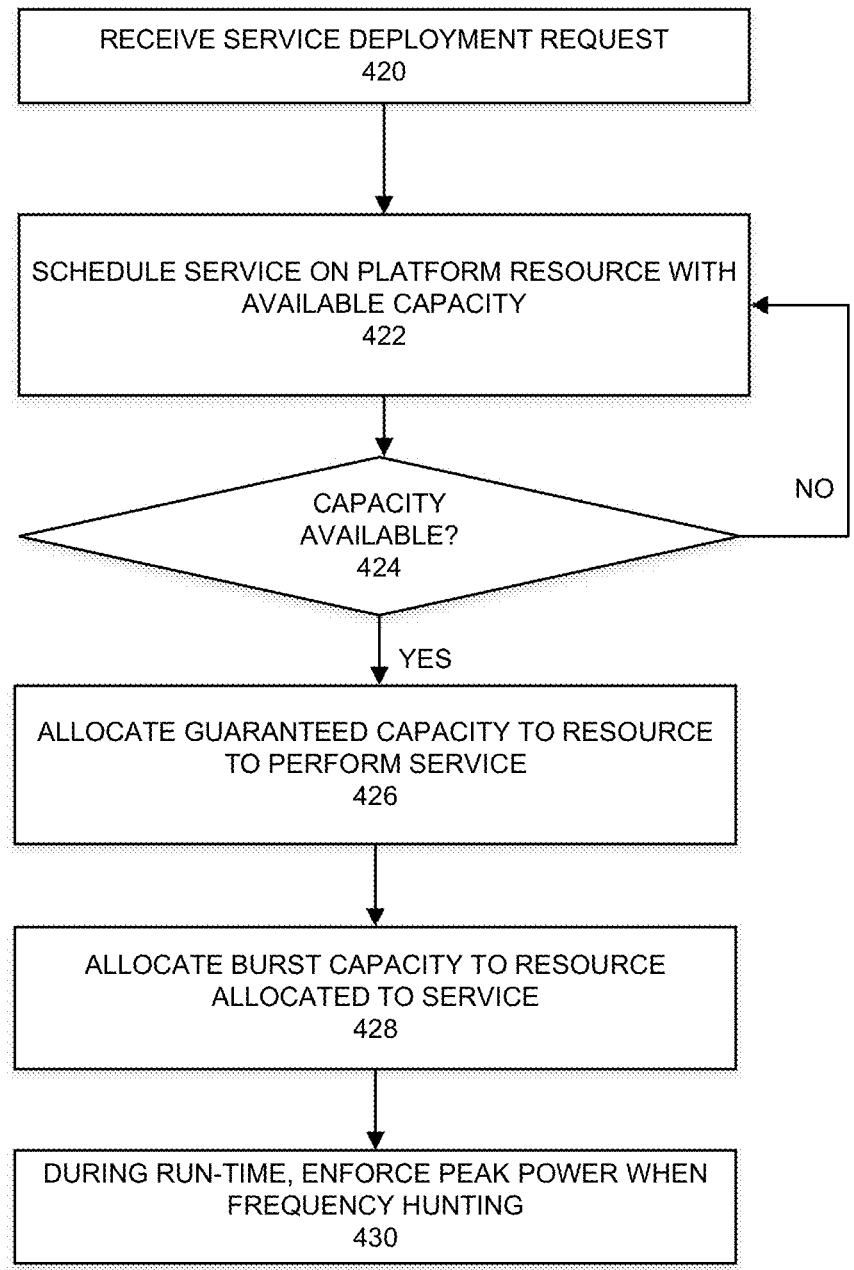

FIG. 4B depicts an example of resource allocation to allocate resources to a service with guaranteed lower frequency while allowing a frequency burst or increase. Increasing frequency of a core group can assist a process to meet an applicable service level agreement (SLA). The process can be performed by an orchestrator, pod manager of a rack or data center, or work scheduler (e.g., hardware queue manager (HQM)). At 420, a service deployment request is received for example from a tenant. At 422, a service is deployed on available resources with available processing ability or resources corresponding to matching priority level. In some examples, the platform resource includes a core group, although resources of other devices (e.g., accelerators, memory, or network interface) can be available for selection. A resource can be selected based on the priority level of the service. For example, a resource can be associated with a priority level and the service can be allocated to the resource based on a priority level of the service corresponding to the priority level of the resource. Examples of service and function priority levels are provided herein. At 424, a determination is made as to whether capacity is available in the resource. If capacity in the resource is available, then 426 follows. If capacity in the resource is not available, then 422 follows. Blocks 422 and 424 can repeat until a resource is available or until a timeout is reached. If enough platform resources are not available, additional resources may be added or re-allocated to provide the requested priority level.

At 426, guaranteed capacity for a resource associated with the service is allocated. Guaranteed capacity can be a minimum frequency for a resource that is to run a service. The service can be run on a core group of one or more cores and the core group is assigned to solely run just that service. At 428, burst capacity for the resource is allocated. Burst capacity can be a maximum core frequency for a core or cores that is to run the service. Burst capacity can be used as a ceiling against which to increase frequency of a core group. At 430, during runtime of processes on the core group, a check is made that a frequency selected does not cause TDP for the CPU (including system agent) to be met or exceeded. Activities of 430 can be similar to those of 408.

Figure 4C:
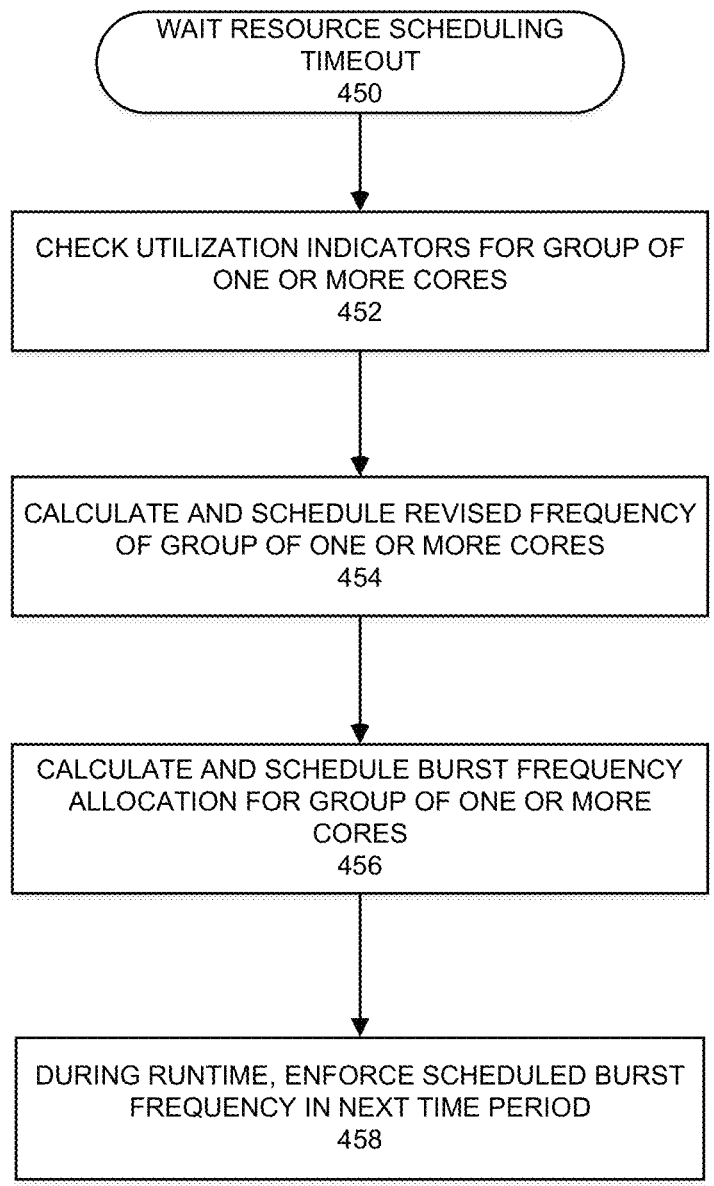

FIG. 4C depicts an example process for shared resource scheduling. The process can be performed by a component (e.g., hardware, firmware, and/or processor-executed software) that controls frequency allocated to one or more cores of a CPU. At 450, expiration of resource scheduling timer is identified. For example, frequency allocation can be made periodically at expiration of a timer or for other reasons (e.g., TDP exceeded or system agent frequency is too low). At 452, a utilization indicator for a group of one or more cores can be checked to determine activity level of the group. For example, a power control unit can check one or more registers or counters to determine a level of activity of the core group. The level of activity can be used to determine if TDP is met or not met. In some cases, temperature of the CPU is determined to identify if TDP is met. At 454, revised frequency of a group of one or more cores for the next time window is determined. For example, if the frequency level of the group can be increased if the TDP is not met and the system agent performance is acceptable. At 456, a burst frequency allocation for a group of one or more cores can be determined for the next time window. For example, at 454 and 456, a revised frequency and burst frequency of a core group can be a reduced or increased frequency based on level of activity indication. For example, a level of activity of 10% can cause reducing core frequency by 90% during a next time window. A level of activity indication of 100% can include turning up core frequency above 100% (use of burst frequency) until hitting a maximum frequency. Other manners of increasing or reducing core group frequency can be used based on utilization of a core group.

At 458, during runtime of processes on the core group, a check is made that a frequency selected does not cause TDP for the CPU (including system agent) to be met or exceeded. Activities of 458 can be similar to those of 408.

Figure 5A:
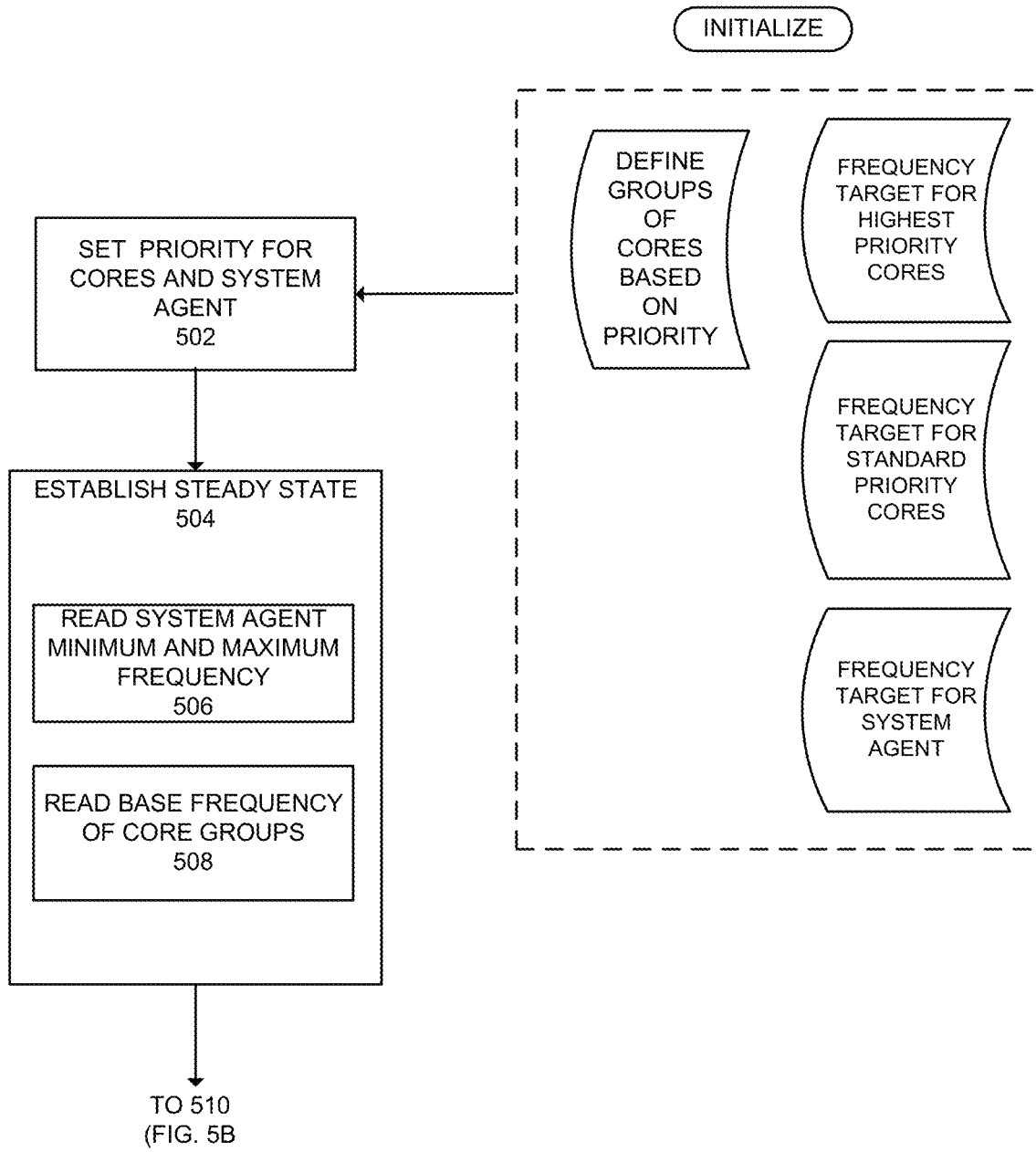
FIGS. 5A and 5B depict an example process.
Figure 5B:
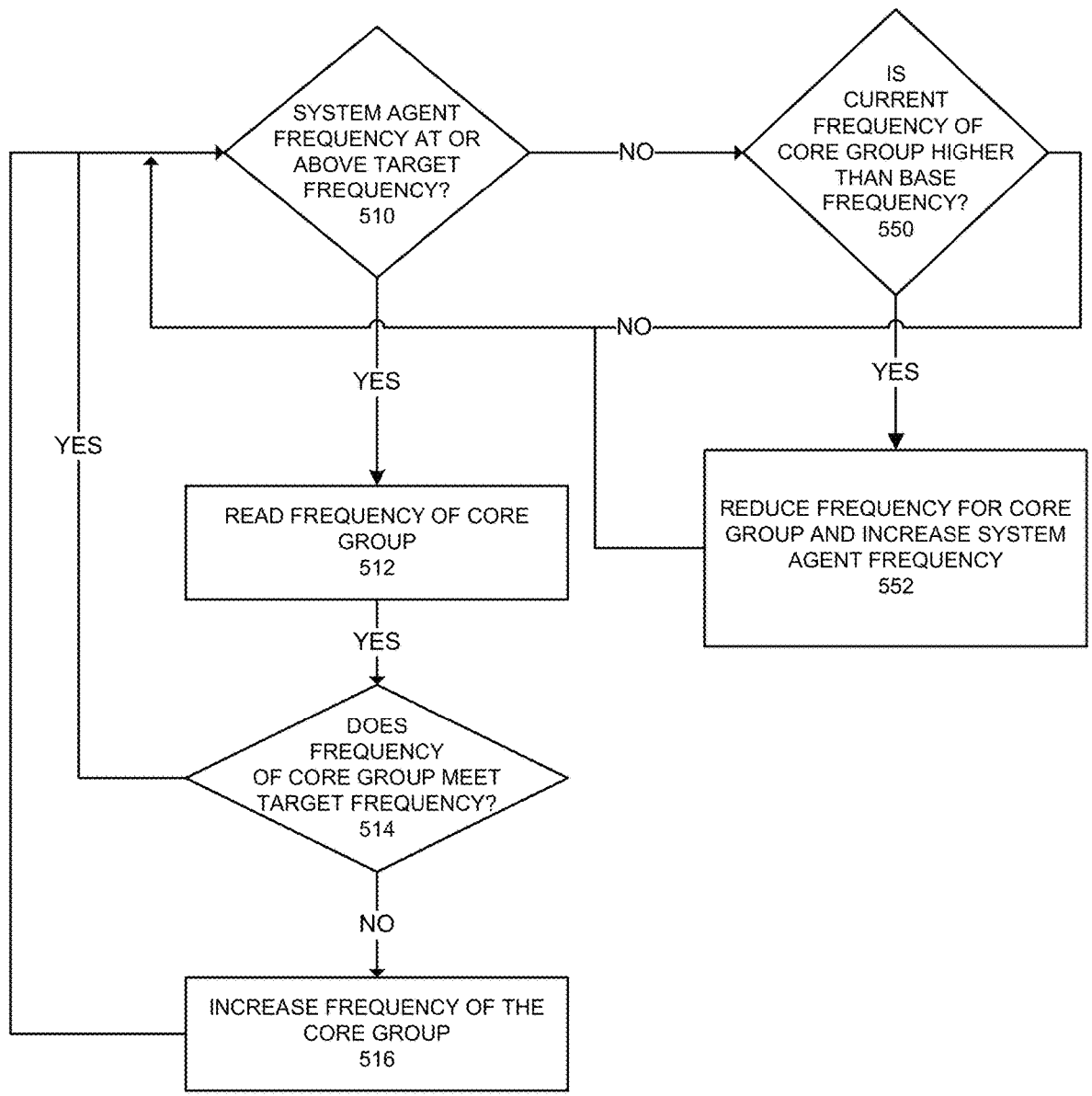

FIGS. 5A and 5B depict an example process for frequency tuning, frequency hunting or power assignment to resources at runtime based on priority of the resource and subject to minimum system agent performance. The process can be performed by a power control unit of a CPU in some examples. Frequency hunting can attempt to step up the frequency to the maximum level for a group or one or more cores while making sure TDP is not met or exceeded, avoiding oversubscription of the CPU and also avoiding the system agent to throttle frequency as this will reduce or impact overall CPU performance. The process can set a target frequency for highest priority cores and use power (frequency) that could otherwise be used by lower priority cores or other resources.

Prior to the process commencing, initialization can include: defining a group of cores in a priority group, setting a target frequency for a highest priority group, setting frequency target for a standard priority group, and setting a frequency target (e.g., lower limit) for a system agent. At 502, priority level for cores and system agent can be set. For example, priority 1 (top priority) can be given to a system agent. Priority 2 can be given to core group 2 of one or more cores. Priority 3 can be given to core group 3 of one or more cores. At 504, a steady state for a platform can be set. For example, 504 can include 506 and/or 508. At 506, a system agent minimum and maximum frequency can be read from a configuration file. For example, the initialization operation can specify parameters in the configuration file. At 508, a base frequency of groups of various priority levels can be read. Continuing to 510 (FIG. 5B), a determination is made as to whether system agent frequency is at or above target frequency for the system agent. The target frequency can be a lower limit frequency for the system agent and specified at initialization. In other words, 510 can allow optimizing core frequency if system agent frequency has been achieved or attempting to take some frequency/power from a core group to increase the system agent frequency. If the system agent frequency is at or above a target frequency for the system agent, then 512 follows. If system agent frequency is below a target frequency for the system agent, 550 follows.

At 512, a frequency for a core group is read. The frequency can be identified in a register or using a system call for example. At 514, a determination is made as to whether the frequency of the core group meets a target maximum frequency. If the frequency of the core group meets a target maximum frequency, then 510 follows. If the frequency of the core group does not meet a target frequency, then 516 follows.

At 516, a frequency of the core group can be increased in frequency but subject to not exceeding a target maximum frequency. For example, the frequency can be increased by a step interval of any value (e.g., 100 MHz). Action 510 follows action 516. In some examples, frequency can be increased into a "turbo" frequency range or span available to a core group. For example, a turbo frequency range can be available using Intel® Turbo Boost Technology.

Where a frequency of operation of a system agent is below a target frequency, at 550, a determination is made as to whether the current frequency for the core group is higher than a base frequency. The base frequency can be a minimum frequency of the core group. If the current frequency for the core group is higher than a base frequency, then 552 follows. If the current frequency for the group of one or more cores is at or below a base frequency, then 510 follows.

At 552, the core group frequency is decreased and system agent frequency is increased. The amount of increase or decrease can be any value, for example, 100 MHz. The system agent frequency can be raised by any value or set to a maximum value. In some examples, the system agent frequency can be set to a minimum (target) level.

In some implementations, 550 can be skipped and if a frequency of operation of a system agent is below a target frequency, at 552, the frequency of the system agent can be increased. In 552, the frequency of the core group may not be reduced beneath a minimum frequency for the core group.

In some scenarios, if a frequency of operation of a system agent is below a target frequency and the frequency of the group of one or more cores is at a base frequency, then the frequency of the system agent can be increased while maintaining the frequency of the group of one or more cores at a base frequency and an error can be indicated to an orchestrator or system administrator. The orchestrator or administrator can respond by moving workloads or processes to another core group, for example.

In some examples, 550 and 552 attempt to reduce frequency of lower priority core groups in order to increase the frequency of the system agent before attempting to reduce a frequency of a higher priority core group.

Figure 6:
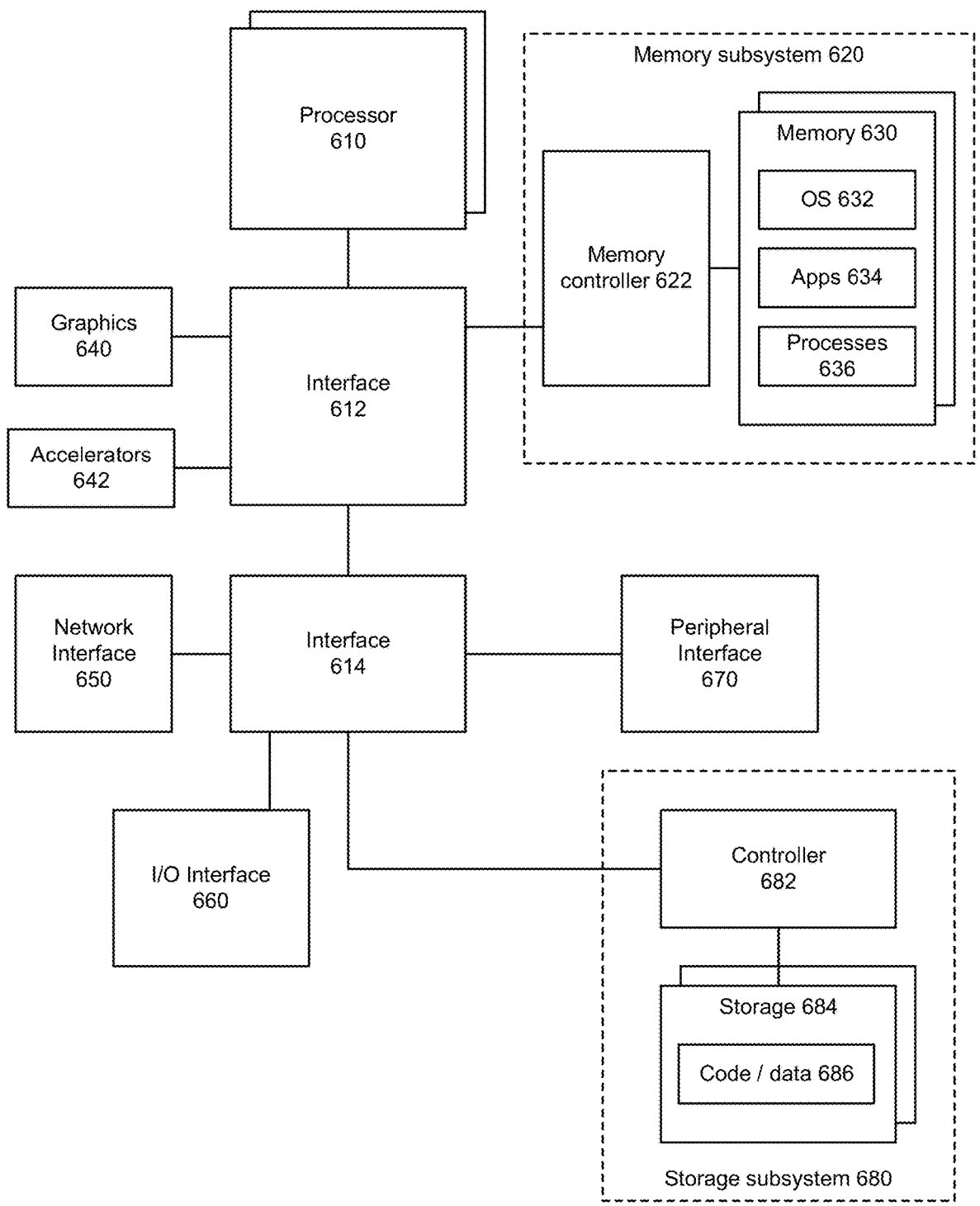
FIG. 6 depicts a system.

FIG. 6 depicts a system. The system can use embodiments described herein to attempt to tune core or resource utilization based on priority level in accordance with embodiments described herein. System 600 includes processor 610, which provides processing, operation management, and execution of instructions for system 600. Processor 610 can include any type of microprocessor, central processing unit (CPU), graphics processing unit (GPU), processing core, or other processing hardware to provide processing for system 600, or a combination of processors. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640, or accelerators 642. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Accelerators 642 can be a programmable or fixed function offload engine that can be accessed or used by a processor 610. For example, an accelerator among accelerators 642 can provide compression (DC) capability, cryptography services such as public key encryption (PKE), cipher, hash/authentication capabilities, decryption, or other capabilities or services. In some embodiments, in addition or alternatively, an accelerator among accelerators 642 provides field select controller capabilities as described herein. In some cases, accelerators 642 can be integrated into a CPU socket (e.g., a connector to a motherboard or circuit board that includes a CPU and provides an electrical interface with the CPU). For example, accelerators 642 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 642 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 600 includes interface 614, which can be coupled to interface 612. In one example, interface 614 represents an interface circuit, which can include stand-alone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a device that is in the same data center or rack or a remote device, which can include sending data stored in memory. Network interface 650 can receive data from a remote device, which can include storing received data into memory. Various embodiments can be used in connection with network interface 650, processor 610, and memory subsystem 620.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage 684 holds code or instructions and data 686 in a persistent state (i.e., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (i.e., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 600 can be implemented using interconnected compute sleds of processors, memories, storages, network interfaces, and other components. High speed interconnects can be used such as PCIe, Ethernet, or optical interconnects (or a combination thereof).

Figure 7:
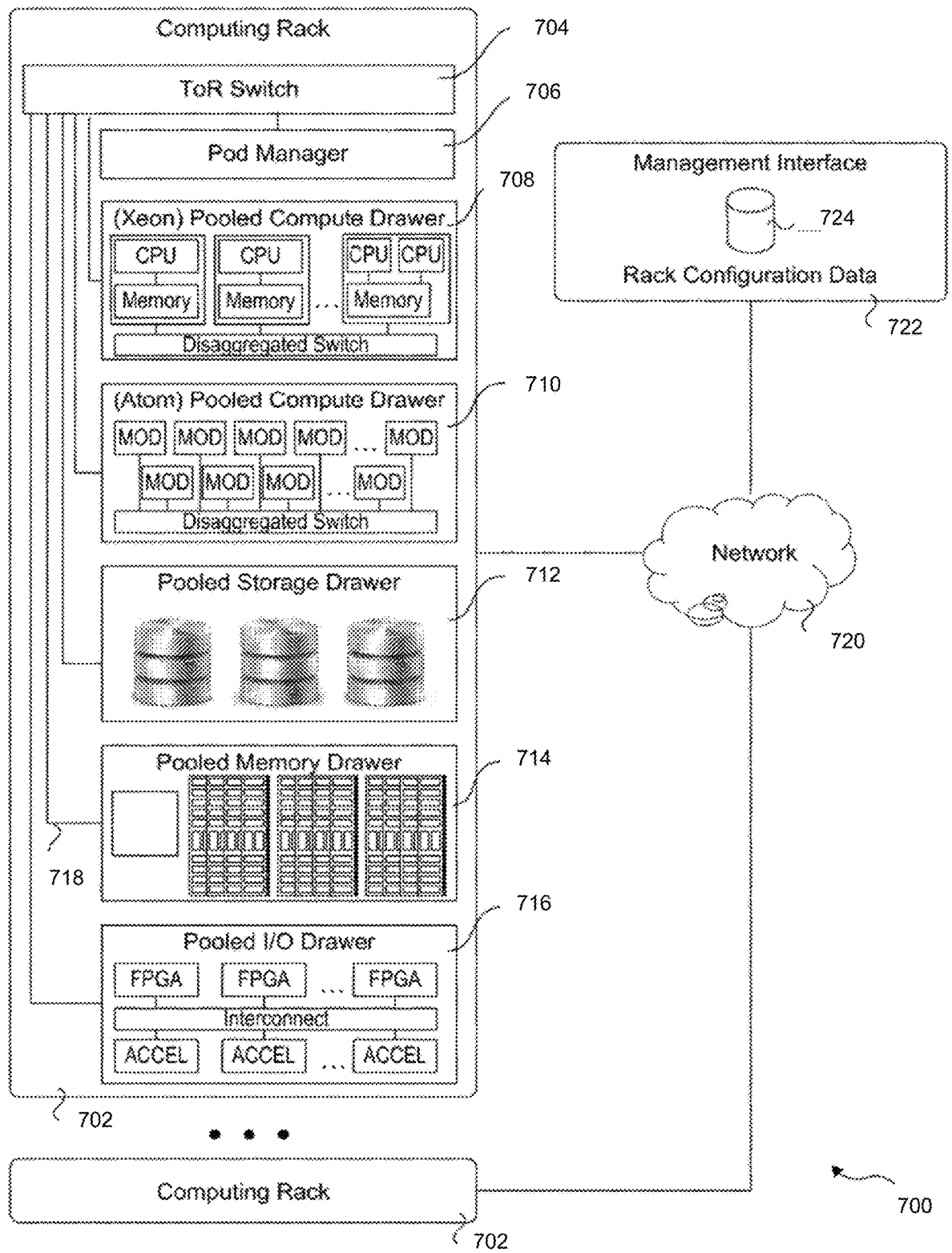
FIG. 7 depicts a data center environment.

FIG. 7 depicts an environment 700 includes multiple computing racks 702, each including a Top of Rack (ToR) switch 704, a pod manager 706, and a plurality of pooled system drawers. Various embodiments can be used to allocate frequency or power to a computing resource. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 708, and Intel® ATOM™ pooled compute drawer 710, a pooled storage drawer 712, a pooled memory drawer 714, and a pooled I/O drawer 716. Each of the pooled system drawers is connected to ToR switch 704 via a high-speed link 718, such as a 40 Gigabit/second (Gb/s) or 100 Gb/s Ethernet link or a 100+Gb/s Silicon Photonics (SiPh) optical link. In one embodiment high-speed link 718 comprises an 800 Gb/s SiPh optical link.

Multiple of the computing racks 702 may be interconnected via their ToR switches 704 (e.g., to a pod-level switch or data center switch), as illustrated by connections to a network 720.

In some embodiments, groups of computing racks 702 are managed as separate pods via pod manager(s) 706. In one embodiment, a single pod manager is used to manage all of the racks in the pod. Alternatively, distributed pod managers may be used for pod management operations.

Environment 700 further includes a management interface 722 that is used to manage various aspects of the environment. This includes managing rack configuration, with corresponding parameters stored as rack configuration data 724. Environment 700 can be used for computing racks.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Figure 8:
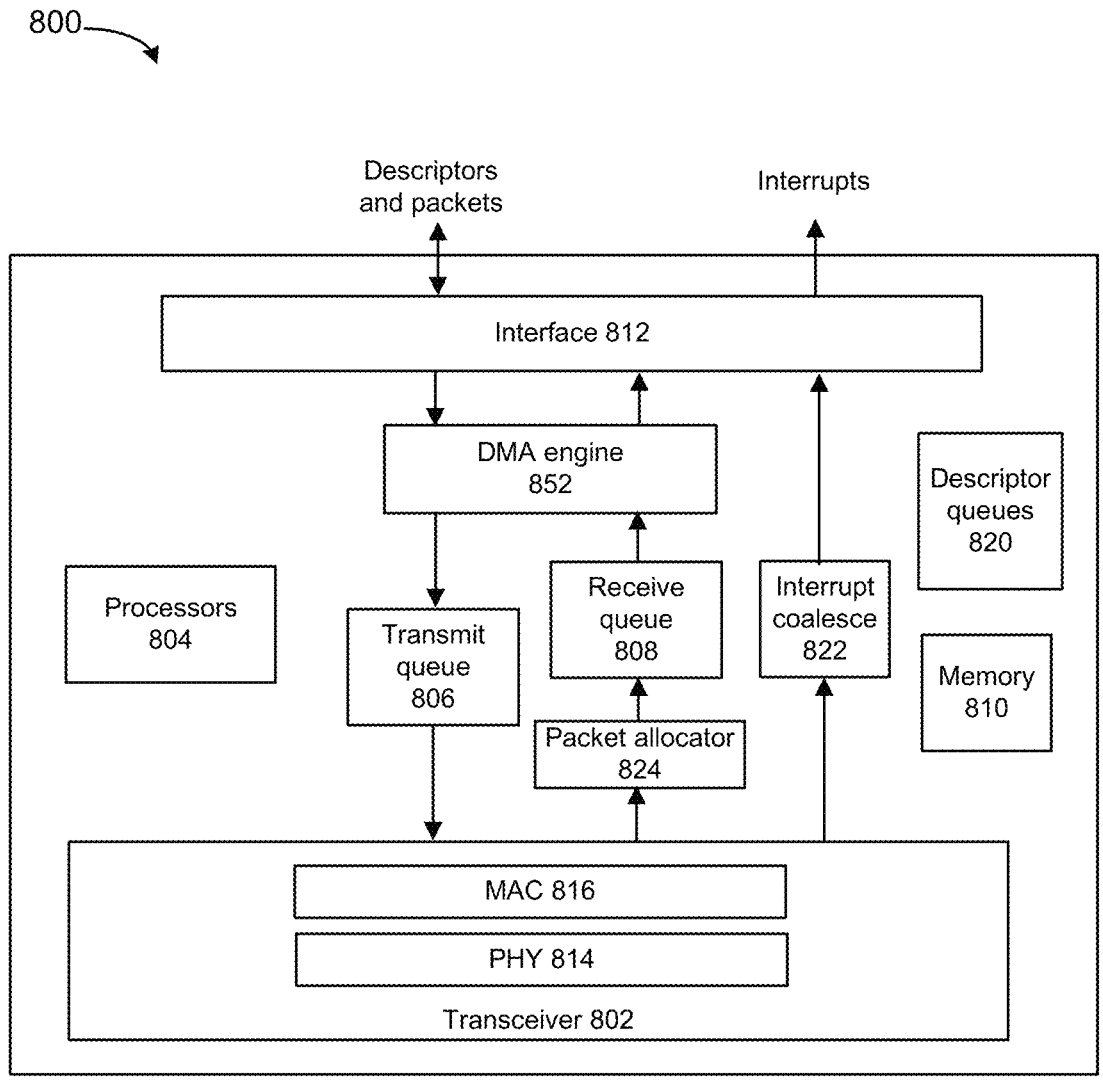
FIG. 8 depicts a network interface.

FIG. 8 depicts a network interface that can use embodiments or be used by embodiments. Various resources in the network interface can be allocated frequency based on techniques described herein. Network interface 800 can include transceiver 802, processors 804, transmit queue 806, receive queue 808, memory 810, and bus interface 812, and DMA engine 852. Transceiver 802 can be capable of receiving and transmitting packets in conformance with the applicable protocols such as Ethernet as described in IEEE 802.3, although other protocols may be used. Transceiver 802 can receive and transmit packets from and to a network via a network medium (not depicted). Transceiver 802 can include PHY circuitry 814 and media access control (MAC) circuitry 816. PHY circuitry 814 can include encoding and decoding circuitry (not shown) to encode and decode data packets according to applicable physical layer specifications or standards. MAC circuitry 816 can be configured to assemble data to be transmitted into packets, that include destination and source addresses along with network control information and error detection hash values. Processors 804 can be any a combination of a: processor, core, graphics processing unit (GPU), field programmable gate array (FPGA), application specific integrated circuit (ASIC), or other programmable hardware device that allow programming of network interface 800. For example, processors 804 can provide for identification of a resource to use to perform a workload and generation of a bitstream for execution on the selected resource. For example, a "smart network interface" can provide packet processing capabilities in the network interface using processors 804.

Packet allocator 824 can provide distribution of received packets for processing by multiple CPUs or cores using timeslot allocation described herein or RSS. When packet allocator 824 uses RSS, packet allocator 824 can calculate a hash or make another determination based on contents of a received packet to determine which CPU or core is to process a packet.

Interrupt coalesce 822 can perform interrupt moderation whereby network interface interrupt coalesce 822 waits for multiple packets to arrive, or for a time-out to expire, before generating an interrupt to host system to process received packet(s). Receive Segment Coalescing (RSC) can be performed by network interface 800 whereby portions of incoming packets are combined into segments of a packet. Network interface 800 provides this coalesced packet to an application.

Direct memory access (DMA) engine 852 can copy a packet header, packet payload, and/or descriptor directly from host memory to the network interface or vice versa, instead of copying the packet to an intermediate buffer at the host and then using another copy operation from the intermediate buffer to the destination buffer.

Memory 810 can be any type of volatile or non-volatile memory device and can store any queue or instructions used to program network interface 800. Transmit queue 806 can include data or references to data for transmission by network interface. Receive queue 808 can include data or references to data that was received by network interface from a network. Descriptor queues 820 can include descriptors that reference data or packets in transmit queue 806 or receive queue 808. Bus interface 812 can provide an interface with host device (not depicted). For example, bus interface 812 can be compatible with PCI, PCI Express, PCI-x, Serial ATA, and/or USB compatible interface (although other interconnection standards may be used).

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Figure 9:
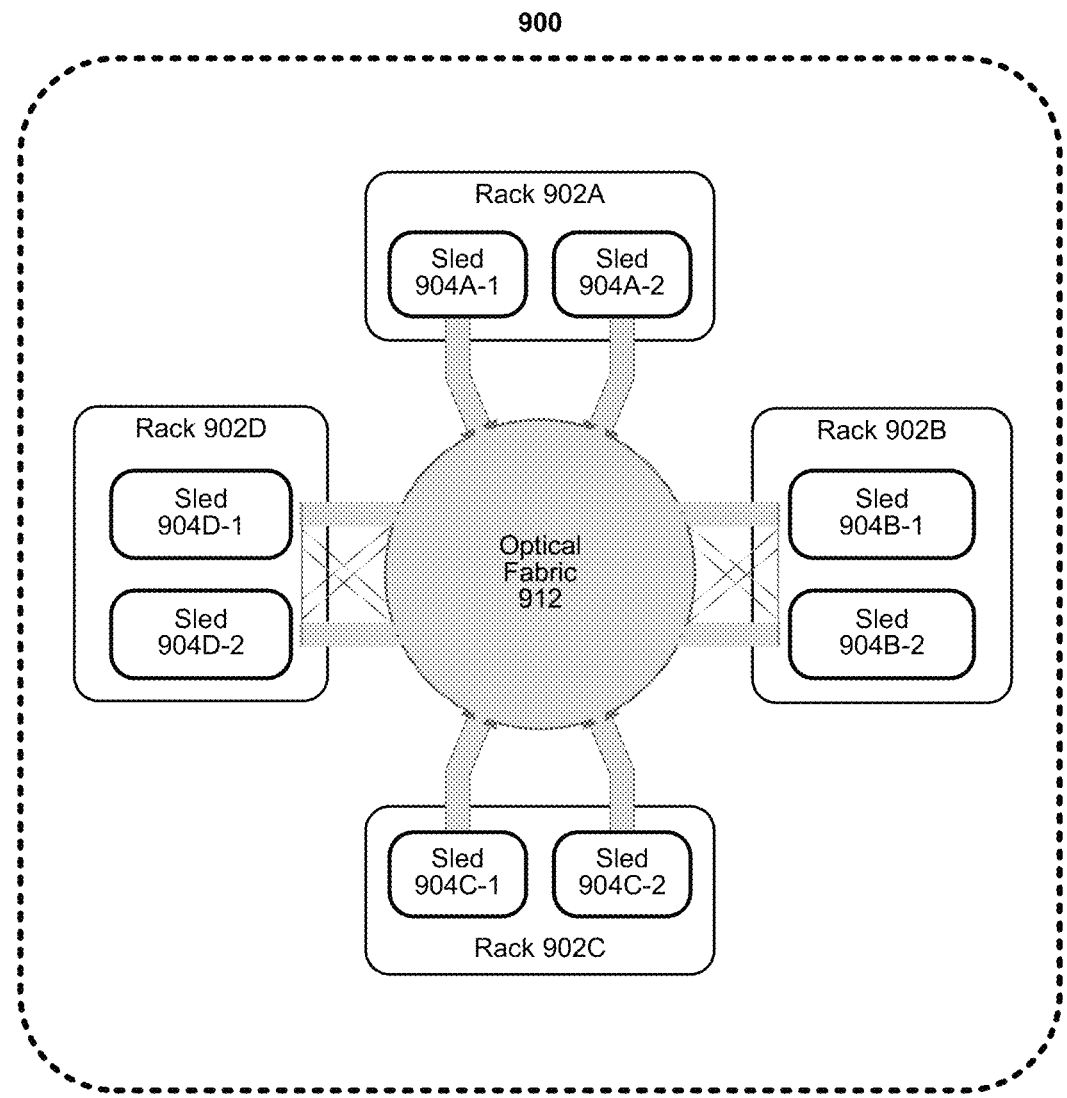
FIG. 9 depicts a data center environment.

FIG. 9 depicts an example of a data center. Various embodiments can be used in or with the data center of FIG. 9 to allocate power or frequency to core or devices. As shown in FIG. 9, data center 900 may include an electrical and/or optical fabric 912. Optical fabric 912 may generally include a combination of optical signaling media (such as optical cabling) and optical switching infrastructure via which any particular sled in data center 900 can send signals to (and receive signals from) each of the other sleds in data center 900. The signaling connectivity that optical fabric 912 provides to any given sled may include connectivity both to other sleds in a same rack and sleds in other racks. Data center 900 includes four racks 902A to 902D and racks 902A to 902D house respective pairs of sleds 904A-1 and 904A-2, 904B-1 and 904B-2, 904C-1 and 904C-2, and 904D-1 and 904D-2. Thus, in this example, data center 900 includes a total of eight sleds. Optical fabric 912 can provide each sled signaling connectivity with one or more of the seven other sleds. For example, via optical fabric 912, sled 904A-1 in rack 902A may possess signaling connectivity with sled 904A-2 in rack 902A, as well as the six other sleds 904B-1, 904B-2, 904C-1, 904C-2, 904D-1, and 904D-2 that are distributed among the other racks 902B, 902C, and 902D of data center 900. The embodiments are not limited to this example. For example, fabric 1012 can provide optical and/or electrical signaling.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Various examples include an apparatus for 5G network slicing comprising: a first core group comprising at least core with an adjustable clock frequency level; a second core group comprising at least core with an adjustable clock frequency level; at least one processor to: permit adjustment of a clock frequency level of a core of the first group based on a thermal design point of the first and second core groups and a system agent frequency. The at least one processor can determine a busy level of a core with an adjustable clock frequency level; based on a busy level of the core exceeding a threshold, increase a clock frequency level of the core with an adjustable clock frequency level but subject to not meeting or exceeding the thermal design point and the system agent frequency not being less than a second threshold. The at least one processor can reserve a minimum frequency for a highest priority service. The at least one processor can reserve a minimum frequency for a low priority service. The at least one processor reserve a minimum frequency for the system agent. The system agent can reserve a minimum frequency for a system agent. The at least one processor can allocate a reserved burst capacity for high or low priority services. A high priority service comprises one or more of: operating system (OS), network stack, virtual switch, workloads, virtual network functions, and management interfaces. A low priority service comprises one or more of: voice, video, or real time gaming. Various embodiments can be used in a base station, central office, 5G compatible base station, network interface, edge node, fog node, server, rack, or data center.

Various embodiments provide a method of allocating a first core group comprising at least core with an adjustable clock frequency level; allocating a second core group comprising at least core with an adjustable clock frequency level; permitting adjustment of a clock frequency level of a core of the first group based on a thermal design point of the first and second core groups and a system agent frequency. The method can include determining a busy level of a core with an adjustable clock frequency level and based on a busy level of the core exceeding a threshold, increasing a clock frequency level of the core with an adjustable clock frequency level but subject to not meeting or exceeding the thermal design point and the system agent frequency not being throttled. The method can include reserving a minimum frequency for a highest priority service. The method can include reserving a minimum frequency for a low priority service. The method can include reserving a minimum frequency for the system agent. The method can include allocating a reserved burst capacity for high or low priority services. A high priority service can be one or more of: operating system (OS), network stack, virtual switch, workloads, virtual network functions, and management interfaces. A low priority service comprises one or more of: voice, video, or real time gaming.

Various embodiments include a system comprising: a network interface; a first core group comprising at least core with an adjustable clock frequency level; a second core group comprising at least core with an adjustable clock frequency level; at least one processor to: permit adjustment of a clock frequency level of a core of the first group based on a thermal design point of the first and second core groups and a system agent frequency. At least one processor can determine a busy level of a core with an adjustable clock frequency level; based on a busy level of the core exceeding a threshold, increase a clock frequency level of the core with an adjustable clock frequency level but subject to not meeting or exceeding the thermal design point and the system agent frequency not being less than a second threshold. At least one processor can allocate a reserved burst capacity for high or low priority services, the high priority service comprises one or more of: operating system (OS), network stack, virtual switch, and management interfaces and the low priority service comprises one or more of: voice, video, or real time gaming. A system can be used as part of a base station, central office, 5G compatible base station, network interface, server, rack, or data center.

Example 1 includes a computer-implemented method comprising: assigning, by a system agent of a central processing unit (CPU), an operating frequency to a core group based on a priority level of the core group, wherein the assigning is capable to increase the operating frequency to less than a maximum operating frequency of the core group.

Example 2 includes any example, and includes assigning, by a system agent of a central processing unit (CPU), an operating frequency to a core group based on a priority level of the core group comprises non-uniformly assigning frequency among core groups with different priority levels.

Example 3 includes any example, and includes assigning, by a system agent of a central processing unit (CPU), an operating frequency to a core group based on a priority level of the core group comprises avoiding throttling of the system agent, avoiding throttling of the system agent comprises maintaining a performance level of the system agent, and the performance level of the system agent is based on an operating frequency of the system agent.

Example 4 includes any example, and includes assigning, by a system agent of a central processing unit (CPU), an operating frequency to a core group based priority level of the core group further comprises avoiding thermal limit of the CPU.

Example 5 includes any example, wherein avoiding thermal limit of the CPU comprises: adjusting the operating frequency of the core group to avoid performance indicators of the CPU.

Example 6 includes any example, wherein the performance indicators indicate CPU utilization corresponds to Thermal Design Point (TDP).

Example 7 includes any example, and includes the system agent allocating a minimum and maximum frequency to the core group based on the priority level of the core group.

Example 8 includes any example, and includes assigning, by the system agent of the CPU, an operating frequency to a second core group based priority level of the second core group and the system agent allocating a minimum and maximum frequency to the second core group based on the priority level of the second core group.

Example 9 includes any example, wherein the priority level of the core group is based on one or more of network processing applications to run on the core group.

Example 10 includes any example, wherein the network processing applications comprise 5G Access and Mobility or 5G access and 5G core network functions.

Example 11 includes any example, and includes an apparatus comprising: a central processing unit (CPU) comprising: a system agent; at least one core group; and a power control unit to allocate power to a core group based on a priority level of the core group, wherein the power control unit is capable to allocate power to a core group by an increase to less than a maximum performance of the core group.

Example 12 includes any example, wherein the power control unit is to allocate power to a core group based on a priority level of the core group and maintain an operating frequency of the system agent.

Example 13 includes any example, wherein the power control unit is to allocate power to a core group based on a priority level of the core group and avoid Thermal Design Point (TDP) limit of the CPU.

Example 14 includes any example, wherein the power control unit is to read performance indicators of the CPU that correlate to temperature of the CPU to avoid Thermal Design Point (TDP) limit of the CPU.

Example 15 includes any example, wherein performance indicators comprise one or more of: Running Average Power Limit (RAPL) or CPU performance counters.

Example 16 includes any example, wherein the power control unit is to allocate a minimum and maximum frequency to the core group based on the priority level of the core group.

Example 17 includes any example, wherein the priority level of the core group is based on one or more of network processing applications to run on the core group.

Example 18 includes any example, wherein the network processing applications comprise 5G Access and Mobility or 5G access and 5G core network functions.

Example 19 includes any example, wherein: high priority processes include mobility management function (AMF) or virtual switching, medium priority processes include session management function (SMF), signaling or call setup or voice communications processing, and low priority processes include user plane function (UPF) and intermediate user plane function (I-UPF), real-time gaming or streaming video or audio.

Example 20 includes any example, and includes: an edge network element, fog network element data center, or server.

What is claimed is:

1. A computer-implemented method comprising:
   assigning, by a system agent of a central processing unit (CPU), an operating frequency to a core group based on a priority level of the core group while avoiding throttling of the system agent, wherein the assigning is capable to increase the operating frequency to less than a maximum operating frequency of the core group.

2. The method of claim 1, wherein assigning, by the system agent of the CPU, the operating frequency to the core group based on the priority level of the core group comprises non-uniformly assigning frequency among core groups with different priority levels.

3. The method of claim 1, wherein:
   avoiding throttling of the system agent comprises maintaining a performance level of the system agent, and the performance level of the system agent is based on an operating frequency of the system agent.

4. The method of claim 1, wherein assigning, by the system agent of the CPU, the operating frequency to the core group based on the priority level of the core group further comprises avoiding thermal limit of the CPU.

5. The method of claim 4, wherein avoiding thermal limit of the CPU comprises:
   adjusting the operating frequency of the core group to avoid performance indicators of the CPU.

6. The method of claim 5, wherein the performance indicators indicate CPU utilization corresponds to Thermal Design Point (TDP).

7. The method of claim 1, comprising:
   the system agent allocating first and second frequencies to the core group based on the priority level of the core group.

8. The method of claim 1, comprising:
   assigning, by the system agent of the CPU, an operating frequency to a second core group based priority level of the second core group and
   the system agent allocating first and second frequencies to the second core group based on the priority level of the second core group.

9. The method of claim 1, wherein the priority level of the core group is based on one or more network processing applications to run on the core group.

10. The method of claim 9, wherein the network processing applications comprise 5G access and 5G core network functions.

11. An apparatus comprising:
    a central processing unit (CPU) comprising:
      a system agent;
      at least one core group; and
      circuitry to allocate power to a core group based on a priority level of the core group, wherein the circuitry is capable to allocate power to a core group by an increase to less than a maximum performance of the core group, wherein the circuitry is to allocate power to a core group based on a priority level of the core group and maintain an operating frequency of the system agent.

12. The apparatus of claim 11, wherein the circuitry is to allocate power to a core group based on a priority level of the core group and avoid Thermal Design Point (TDP) limit of the CPU.

13. The apparatus of claim 12, wherein the circuitry is to read performance indicators of the CPU that correlate to temperature of the CPU to avoid the TDP limit of the CPU.

14. The apparatus of claim 13, wherein performance indicators comprise one or more of: Running Average Power Limit (RAPL) or CPU performance counters.

15. The apparatus of claim 11, wherein the circuitry is to allocate first and second frequencies to the core group based on the priority level of the core group.

16. The apparatus of claim 11, wherein the priority level of the core group is based on one or more network processing applications to run on the core group.

17. The apparatus of claim 16, wherein the network processing applications comprise 5G access and 5G core network functions.

18. The apparatus of claim 16, wherein:
    high priority network processing applications include mobility management function (AMF) or virtual switching, medium priority network processing applications include session management function (SMF), signaling or call setup or voice communications processing, and low priority network processing applications include user plane function (UPF) and intermediate user plane function (I-UPF), real-time gaming or streaming video or audio.

19. The apparatus of claim 11, comprising: an edge network element, fog network element data center, or server and wherein the edge network element, fog network element data center, or server comprises the CPU.

20. The apparatus of claim 11, wherein the at least one core group comprises a first core group of one or more cores and a second core group of one or more cores, a first 5G network slice is assigned to the first core group, a second 5G network slice is assigned to the second core group, and the circuitry is to allocate power to the first core group based on a priority level of the first 5G network slice and allocate power to the second core group based on a priority level of the second 5G network slice.

\* \* \* \* \*